United States Patent
Fu et al.

(10) Patent No.: US 10,823,904 B1
(45) Date of Patent: Nov. 3, 2020

(54) DISPLAY DEVICE

(71) Applicant: Au Optronics Corporation, Hsinchu (TW)

(72) Inventors: Hsiu-Ting Fu, Hsinchu (TW);
Kun-Hung Hsieh, Hsinchu (TW);
Chun-Liang Lin, Hsinchu (TW);
Ren-Wei Huang, Hsinchu (TW);
Hsin-Chen Lu, Hsinchu (TW);
Min-Chieh Chen, Hsinchu (TW);
Chien-Pang Liu, Hsinchu (TW);
Yen-Ling Chen, Hsinchu (TW)

(73) Assignee: Au Optronics Corporation, Hsinchu (TW)

( * ) Notice: Subject to any disclaimer, the term of this patent is extended or adjusted under 35 U.S.C. 154(b) by 0 days.

(21) Appl. No.: 16/726,267

(22) Filed: Dec. 24, 2019

(30) Foreign Application Priority Data

Jul. 11, 2019 (TW) ............................ 108124405 A (51) Int. Cl.
*F21V 8/00* (2006.01)
(52) U.S. Cl.
CPC ......... *G02B 6/0068* (2013.01); *G02B 6/0085* (2013.01)
(58) Field of Classification Search
CPC ............................ G02B 6/0068; G02B 6/0085
USPC ........................................................ 362/97.1
See application file for complete search history.

(56) References Cited

U.S. PATENT DOCUMENTS

| 10,055,058 | B2 | 8/2018 | Kimura et al. | |
|---|---|---|---|---|
| 2006/0245214 | A1* | 11/2006 | Kim | G02B 6/0085 362/632 |
| 2006/0279216 | A1* | 12/2006 | Kim | G02B 6/0085 313/631 |
| 2007/0030867 | A1* | 2/2007 | Park | G02F 1/133621 372/22 |
| 2008/0239748 | A1* | 10/2008 | Hatzenbuehler | G02B 6/0008 362/554 |
| 2009/0097228 | A1* | 4/2009 | Ha | G02F 1/133604 362/97.1 |
| 2009/0185103 | A1* | 7/2009 | Han | G02B 6/0088 349/58 |

(Continued)

FOREIGN PATENT DOCUMENTS

| CN | 202001920 | 10/2011 |
|---|---|---|
| CN | 204406921 | 6/2015 |

(Continued)

*Primary Examiner* — Bryon T Gyllstrom
(74) *Attorney, Agent, or Firm* — JCIPRNET (57) ABSTRACT

A display device includes at least one display module and a backlight module. The display module includes display units and N driving chips. The N driving chips are arranged along a first direction and electrically connected to the display units. The display units are connected and arranged in N rows in the first direction and M columns in a second direction. N and M are respectively greater than or equal to 1. The backlight module includes a light bar assembly adapted to be disposed below a column of the M columns of the display units farthest from the driving chips, and a length of the light bar assembly corresponds to that of the display units along the first direction. The light bar assembly includes at least one first light bar unit. A length of each first light bar unit is X times the length of each display unit along the first direction, and X is greater than or equal to 1.

14 Claims, 10 Drawing Sheets

(56) References Cited

U.S. PATENT DOCUMENTS

| | | | | |
|---|---|---|---|---|
| 2010/0046201 | A1* | 2/2010 | Wang | H05K 1/0204 362/97.1 |
| 2010/0165233 | A1* | 7/2010 | Jung | G02B 6/0088 349/58 |
| 2010/0165237 | A1* | 7/2010 | Jung | G02B 6/0073 349/58 |
| 2010/0302805 | A1* | 12/2010 | Jeong | G02B 6/008 362/612 |
| 2012/0050636 | A1* | 3/2012 | Jeong | G02F 1/133308 349/58 |
| 2012/0099341 | A1* | 4/2012 | Kwon | G02B 6/0085 362/612 |
| 2014/0268654 | A1* | 9/2014 | Wagner | H05K 9/0054 362/97.1 |
| 2014/0362574 | A1 | 12/2014 | Barrett | |
| 2016/0364082 | A1 | 12/2016 | Kimura et al. | |

FOREIGN PATENT DOCUMENTS

| | | |
|---|---|---|
| CN | 105659023 | 6/2016 |
| CN | 106062618 | 10/2016 |
| CN | 108828819 | 11/2018 |
| CN | 208418249 | 1/2019 |
| WO | 2017156766 | 9/2017 |

* cited by examiner

DISPLAY DEVICE

CROSS-REFERENCE TO RELATED APPLICATION

This application claims the priority benefit of Taiwan application serial no. 108124405, filed on Jul. 11, 2019. The entirety of the above-mentioned patent application is hereby incorporated by reference herein and made a part of this specification.

TECHNICAL FIELD

The disclosure relates to a display device including a backlight module that is capable of providing backlight modules of different lengths in response to display modules of different sizes.

DESCRIPTION OF RELATED ART

A liquid crystal display (LCD) is widely used in daily lives, and the stability of the LCD in terms of optical performance and the compact design of the LCD also receive more and more attention. In general, the LCD adopts a dedicated light bar. However, in order to accommodate the LCDs of different sizes, the lengths of the light bars of the backlight modules of the LCDs are also correspondingly different. Therefore, the light bars of different sizes of the display modules cannot be shared. On the other hand, the heat sinks of the backlight modules are also required to be arranged in response to the light bars of different lengths.

Therefore, how to ensure the backlight modules or the heat sinks of the backlight modules to be commonly used for the LCDs of different sizes and simplify the complicated manufacturing process, e.g., retooling or reordering parts or materials, is one of the issues to be solved by those skilled in the art.

SUMMARY

The disclosure provides a display device having a backlight module which may be commonly used by display modules of different sizes, so as to improve the flexibility of combined use of elements.

According to an embodiment of the disclosure, a display device includes a display module and a backlight module. The display module includes a plurality of display units and N driving chips, wherein the N driving chips are arranged along a first direction and electrically connected to the display units. The display units are connected to each other and are arranged in N rows in the first direction and in M columns in a second direction. N and M are respectively greater than or equal to 1. The backlight module includes a light bar assembly. The light bar assembly is adapted to be disposed below one column of the M columns of the display units farthest from the driving chips, and a length of the light bar assembly corresponds to a length of each of the display units along the first direction. The light bar assembly includes at least one first light bar unit. A length of each of the at least one first light bar unit is X times the length of each of the display units along the first direction, and X is greater than or equal to 1.

In an embodiment of the disclosure, the at least one first light bar unit includes a plurality of first light bar units successively arranged below the one column of the M columns of the display units farthest from the driving chips.

In an embodiment of the disclosure, the light bar assembly includes a plurality of connectors located on the at least one first light bar unit, respectively, and the connectors face one side of the light bar assembly.

In an embodiment of the disclosure, the light bar assembly includes a plurality of light sources disposed on the at least one first light bar unit at equivalent intervals.

In an embodiment of the disclosure, the backlight module further includes at least one first heat sink unit fixed to and thermally coupled to the at least one first light bar unit, and a length of each of the at least one first heat sink unit is equal to the length of the at least one first light bar unit.

In an embodiment of the disclosure, the light bar assembly further includes at least one second light bar unit, and a length of each of the at least one second light bar unit is Y times the length of each of the display units along the first direction. Y is greater than or equal to 1 but not equal to X, and at least one first light bar unit and at least one second light bar unit are successively arranged below the one column of the M columns of the display units farthest from the driving chips.

In an embodiment of the disclosure, the light bar assembly includes a plurality of connectors respectively located on the at least one first light bar unit and the at least one second light bar unit, and the connectors face the same side.

In an embodiment of the disclosure, X is equal to 1 and Y is equal to 2.

In an embodiment of the disclosure, the light bar assembly includes a plurality of light sources disposed on the at least one first light bar unit and the at least one second light bar unit at equivalent intervals.

In an embodiment of the disclosure, the backlight module further includes at least one first heat sink unit and at least one second heat sink unit. The first heat sink unit is fixed to and thermally coupled to at least one first light bar unit, and a length of each of the at least one first heat sink unit is equal to the length of the at least one first light bar unit. The second heat sink unit is fixed to and thermally coupled to at least one second light bar unit, and a length of each of the at least one second heat sink unit is equal to the length of the at least one second light bar unit.

In an embodiment of the disclosure, the light bar assembly further includes at least one third light bar unit. A length of each of the at least one third light bar unit is Z times the length of each of the display units along the first direction, and Z is greater than or equal to 1 but is not equal to X nor Y. The at least one first light bar unit, the at least one second light bar unit, and the at least one third light bar unit are successively arranged below the one column of the M columns of the display units farthest from the driving chips.

In an embodiment of the disclosure, the light bar assembly includes a plurality of connectors respectively located on the at least one first light bar unit, the at least one second light bar unit, and the at least one third light bar unit, and the connectors face the same side of the light bar assembly.

In an embodiment of the disclosure, X is equal to 1, Y is equal to 2, and Z is equal to 3.

In an embodiment of the disclosure, the light bar assembly includes a plurality of light sources disposed on the at least one first light bar unit, the at least one second light bar unit, and the at least one third light bar unit at equivalent intervals.

In an embodiment of the disclosure, the backlight module further includes at least one first heat sink unit, at least one second heat sink unit, and at least one third heat sink unit. The at least one first heat sink unit is fixed to and thermally coupled to the at least one first light bar unit, and a length of each of the at least one first heat sink unit is equal to length of the at least one first light bar unit. The second heat sink unit is fixed to and thermally coupled to the at least one second light bar unit, and a length of each of the at least one second heat sink unit is equal to the length of the at least one second light bar unit. The at least one third heat sink unit is fixed to and thermally coupled to at least one third light bar unit, and a length of each of the at least one third heat sink unit is equal to the length of the at least one third light bar unit.

In view of the above, the backlight module of the display device provided in one or more embodiments of the disclosure includes the light bar assembly which includes at least one light bar unit. Specifically, the light bar assembly may be composed of a plurality of light bar units configured to correspond to the display modules different sizes, so as to provide the light sources required by the display module. As such, manufacturers need not manufacture special light bars for complying with the display modules of different sizes, and the light bar assembly provided in one or more embodiments of the disclosure may be designed to have different lengths corresponding to the display modules of different sizes, so as to simplify the complicated manufacturing process such as retooling or reordering parts or materials for manufacturing the light bars for the display modules of different sizes.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
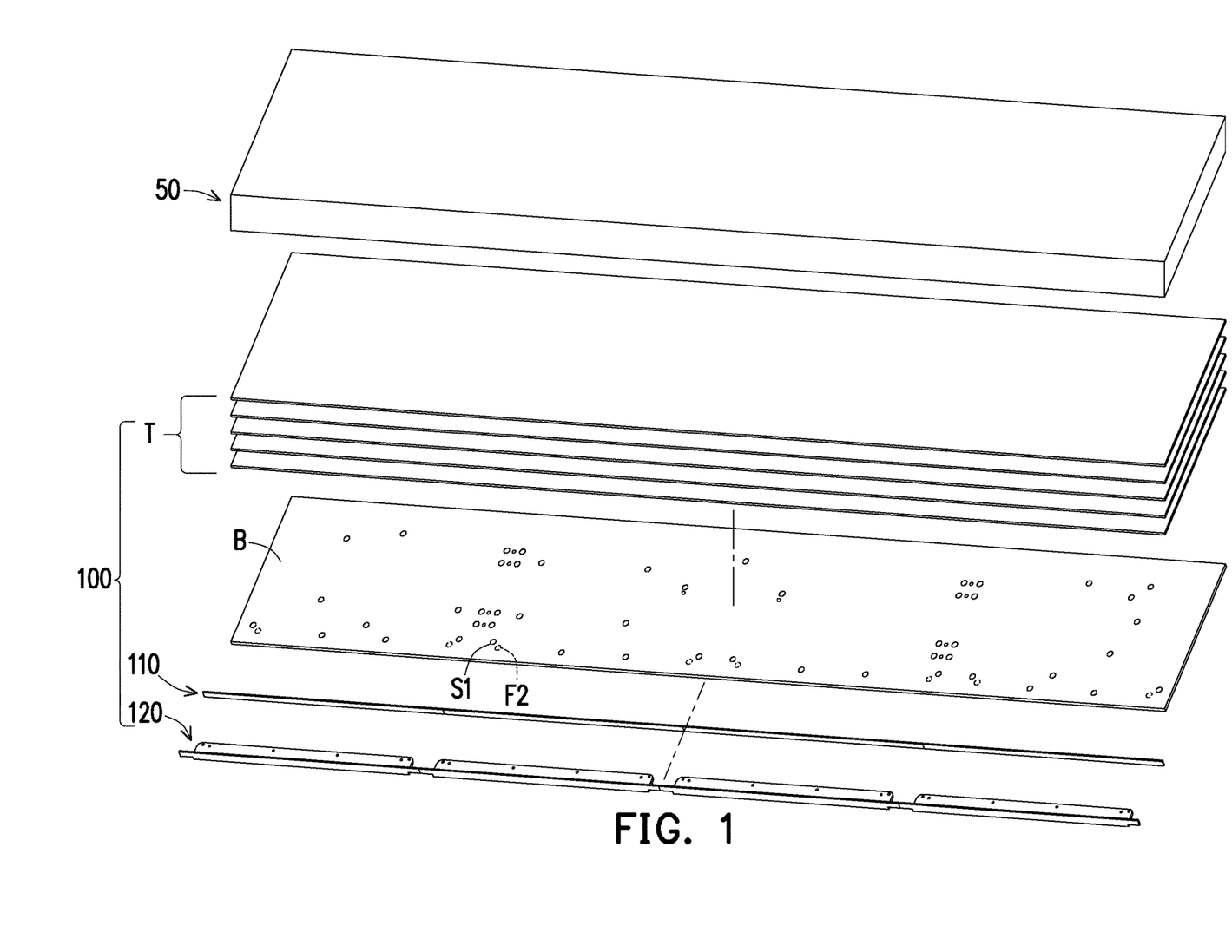
FIG. 1 is a schematic exploded view illustrating a backlight module applied to a display module according to an embodiment of the disclosure.

FIG. 1 is a schematic exploded view illustrating a backlight module applied to a display module according to an embodiment of the disclosure. Note that FIG. 1 schematically illustrates the relative locations of the elements, and the sizes of the elements are not limited to what is illustrated in FIG. 1. With reference to FIG. 1, in this embodiment, the backlight module 100 includes a light bar assembly 110. Here, the light bar assembly 110 is a light-emitting diode (LED) light bar assembly, whereas the type of the light source is not limited thereto. The backlight module 100 provided in this embodiment is disposed below a display module 50, and the display module 50 is a combined display module composed of a plurality of display units 52. In other embodiments, the backlight module 100 may also be disposed below an integral display device, and the display device to which the backlight module 100 is applied is not limited to what is described herein.

In this embodiment, the display module 50 includes a front frame (not individually shown) and a middle frame (not individually shown) configured to latch and fix a back plate B to the display module 50. The backlight module 100 also includes a multi-layer film layer T, etc. Here, the film layer T is, a reflective layer, a diffusion layer, a light guiding layer, or a combination thereof. Here, the basic components of the display device and the backlight module may be sufficiently taught, suggested, and implemented according to the general knowledge associated with the pertinent technical field and thus will not be further described. The size relationship between the display module and the backlight module is explained below.

FIG. 2A to FIG. 2D are schematic top views illustrating various backlight modules applied to various display modules according to several embodiments of the disclosure. Since the backlight module is disposed below the display module, the backlight module is shown by dotted lines.

Figure 2A:
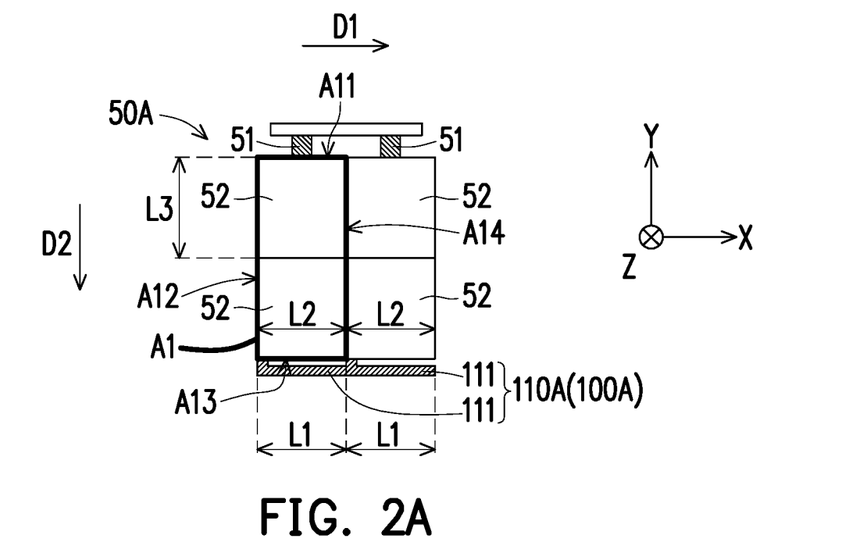
FIG. 2A to FIG. 2D are schematic top views illustrating various backlight modules applied to various display modules according to several embodiments of the disclosure.

As shown in FIG. 2A, in this embodiment, the display module 50A includes N driving chips 51 arranged along a first direction D1 and a plurality of display units 52 electrically connected to the N driving chips 51 and arranged in a matrix. Besides, in this embodiment, the display units 52 are arranged in N rows in a first direction D1 and in M columns in a second direction D2.

In this embodiment, N is equal to 2; that is, the number of the driving chips 51 is two, and the display units 52 are arranged in two rows, for instance. Besides, in this embodiment, M is equal to 2' that is, the display units 52 are arranged in two columns. Therefore, the display module 50A provided in this embodiment includes four display units 52 arranged in a 2×2 matrix. However, in other embodiments, as long as N and M are respectively greater than or equal to 1, they do not depart from the scope of protection provided herein.

In other words, the so-called display module is a combination of a plurality of display units 52 in form of a matrix. Designers may determine the size of the matrix to produce the display devices of different sizes according to different size requirements. Note that the shape of the individual display unit 52 shown in the drawings is schematic; as a matter of fact, the individual display unit 52 may be of a bar-like rectangular shape.

In detail, each driving chip 51 is arranged in the second direction D2 and corresponds to each display unit 52 arranged in this row of driving chips 51. Each display unit 52 in each row is collectively defined as a similar or identical display region. That is to say, each driving chip 51 may respectively control the display region in the corresponding row. For instance, the display module 50A includes a display region A1. The driving chip 51 corresponding to the display region A1 may determine the display level of the display region A1. In addition, the driving chip 51 provided in this embodiment includes a chip on film (COF) substrate or a tape carrier package (TCP) substrate.

In this embodiment, the display region A1 has a first side A11 and a third side A13 along the first direction D1 as well as a second side A12 and a fourth side A14 along the second direction D2. The second side A12 is opposite to the fourth side A14, and the first side A11 is connected to the second side A12 and the fourth side A14. The third side A13 is opposite to the first side A11, and the third side A13 is connected to the second side A12 and the fourth side A14. Therefore, a length L2 of the individual display unit 52 along the first direction D1 is a distance from the first side A11 to the fourth side A14.

For instance, a length of the panel along the second direction D2 is from 65 inches to 85 inches, a length of the second side A12 (or the fourth side A14) along the second direction D2 is, for instance, ¼, ⅓, ½, ¾, or 1 of the length of the panel from 65 inches to 85 inches.

In this embodiment, a length L3 of the individual display unit 52 along the second direction D2 may be an integer multiple of a unit resolution width (resolution x pixel interval). In an embodiment, the length L3 of the individual display unit 52 along the second direction D2 is, for instance, 15 cm or 30 cm. In other embodiments, the length L3 of the individual display unit 52 along the second direction D2 may be customized according to customers' requirements and should not be construed as a limitation in the disclosure.

In an embodiment, the display region A1 has a plurality of sub-pixels to display different colors, e.g., red, green, and blue sub-pixels, which should however not be construed as a limitation in the disclosure. As such, the display module 50A can be constituted by a plurality of identical or similar display regions A1.

Note that the backlight module 100A located below the display module 50A includes a light bar assembly 110A. The light bar assembly 110A is disposed below one of the columns of the display units 52 farthest from the driving chips 51 (i.e., the second column), and a length of the light bar assembly 110A corresponds to (for instance, is equal to) the length of the display units 52 along the first direction D1. In the present embodiment, the light bar assembly 110A is disposed below the display units 52. In fact, in the projection of the Z direction, the projection area of the display units 52 does not overlap the light bar assembly 110A. In addition, the light bar assembly 110A and the display units 52 are not coplanar in the Z direction, as shown in FIG. 2A, which is a top view.

In the present embodiment, the light bar assembly 110A includes at least one first light bar unit 111. A length L1 of the first light bar unit 111 is X times the length L2 of each display unit 52 along the first direction D1. Specifically, in this embodiment, X is 1. However, X is not limited to 1; in other embodiments, X may also be an integer greater than 1. That is, in the present embodiment, the length L1 of the first light bar unit 111 along the first direction D1 corresponds to the length L2 each of the display units 52 along the first direction D1. Thus, in the present embodiment, the light bar assembly 110A is comprised of two first light bar units 111 to match the length of the display module 50A along the first direction D1, so as to provide the light source required by the display module 50A. Since the number of the display units 52 along the first direction D1 is two in this embodiment, the length of the display module 50A along the first direction D1 is the lengths of two display units 52, i.e., twice the length L2.

Figure 2B:
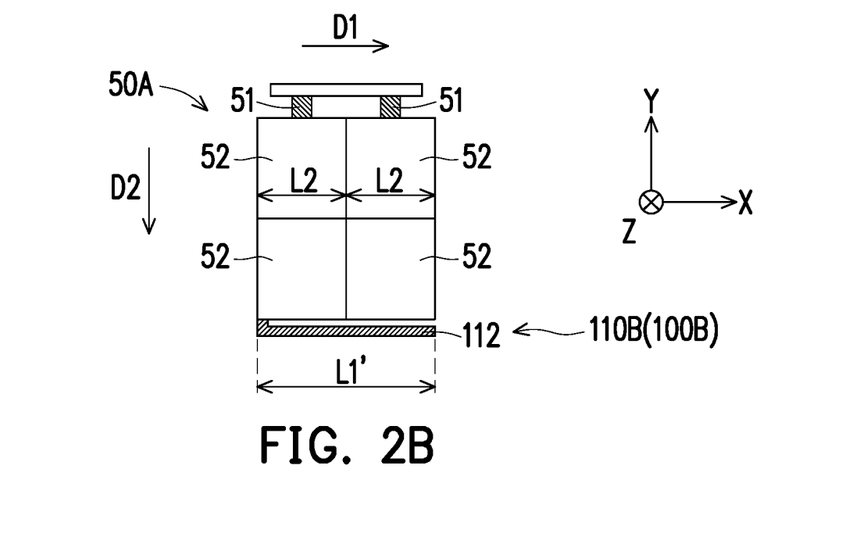

Please refer to FIG. 2B. In this embodiment, the light bar assembly 110B of the backlight module 100B is slightly different from the light bar assembly 110A of the backlight module 100A depicted in FIG. 2A. Specifically, the light bar assembly 110B of the backlight module 100B includes at least one second light bar unit 112. The light bar assembly 110B is disposed below one of the columns of the display units 52 farthest from the driving chips 51 (i.e., the second column), and the length of the light bar assembly 110B corresponds to (for instance, is equal to) the length of the display units 52A along the first direction D1. In the present embodiment, the light bar assembly 110B is disposed below the display units 52. In fact, in the projection of the Z direction, the projection area of the display units 52 does not overlap the light bar assembly 110B. Moreover, the light bar assembly 110B and the display units 52 are coplanar in the Z direction, as shown in FIG. 2B, which is a top view.

In this embodiment, a length L1' of the second light bar unit 112 is Y times the length L2 of each display unit 52 along the first direction D1, and Y is greater than or equal to 1. In the present embodiment, Y is 2. However, Y is not limited to 2; in other embodiments, Y may be other integers. That is, in the present embodiment, the length L1' of the second light bar unit 112 along the first direction D1 may correspond to the sum of the lengths L2 of the two display units 52 along the first direction D1. Therefore, the light bar assembly 110B provided in the present embodiment refers to one second light bar unit 112, which can match the length of the display module 50A along the first direction D1, and can provide the light source required by the display module 50A. Since the number of the display units 52 along the first direction D1 is two in this embodiment, the length of the display module 50A along the first direction D1 is the lengths of two display units 52, i.e., twice the length L2.

Figure 2C:
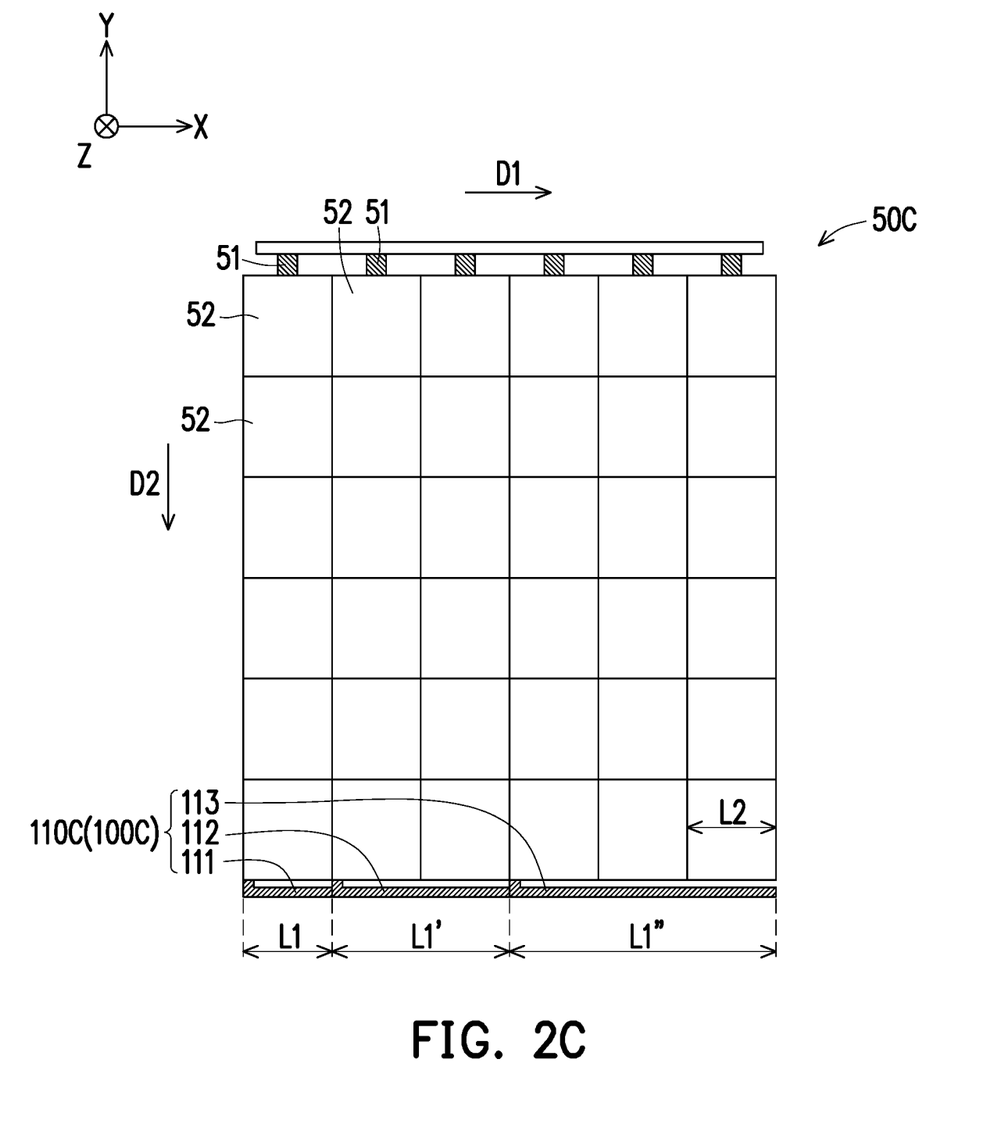

Please refer to FIG. 2C. In this embodiment, the display module 50C is composed of the display unit 52 arranged in form of a 6×6 matrix. The backlight module 100C located below the display module 50C includes at least two of the first light bar unit 111, the second light bar unit 112, and a third light bar unit 113.

In the present embodiment, a length L1" of the third light bar unit 113 is Z times the length L2 of each display unit 52 along the first direction D1, and Z is greater than or equal to 1. In the present embodiment, X is 1, Y is 2, and Z is 3. That is, the length L1" of a third light bar unit 113 along the first direction D1 corresponds to the lengths L2 of three display units 52 along the first direction D1. However, X, Y, and Z are not limited thereto. In other embodiments, X, Y, and Z may be other integers as long as Y is greater than 1 and not equal to X, and Z is greater than 1 and not equal to X nor Y.

In this embodiment, the display units 52 are arranged in N rows in the first direction D1. Where N is equal to 6, the backlight module 100C located below the display module 50C may be a combination of the first light bar unit 111, the second light bar unit 112, and the third light bar unit 113 successively arranged below one of the columns (i.e., the sixth column) of the display units 52 farthest from the driving chips 51.

In the present embodiment, the light bar assembly 110C is disposed below the display units 52. In fact, in the projection of the Z direction, the projection area of the display units 52 does not overlap the light bar assembly 110C. Moreover, the light bar assembly 110C and the display units 52 are not coplanar in the Z direction, as shown in FIG. 2C, which is a top view.

Certainly, in other embodiments, the backlight module 100C located below the display module 50C may also be selected to be composed of three second light bar units 112, six first light bar units 111, and two third light bar units 113, composed of two second light bar units 112 and two first light bar units 111, or composed of other combinations of the first, second, and/or third light bar units 111, 112, and 113, which should not be construed as a limitation in the disclosure.

Figure 2D:
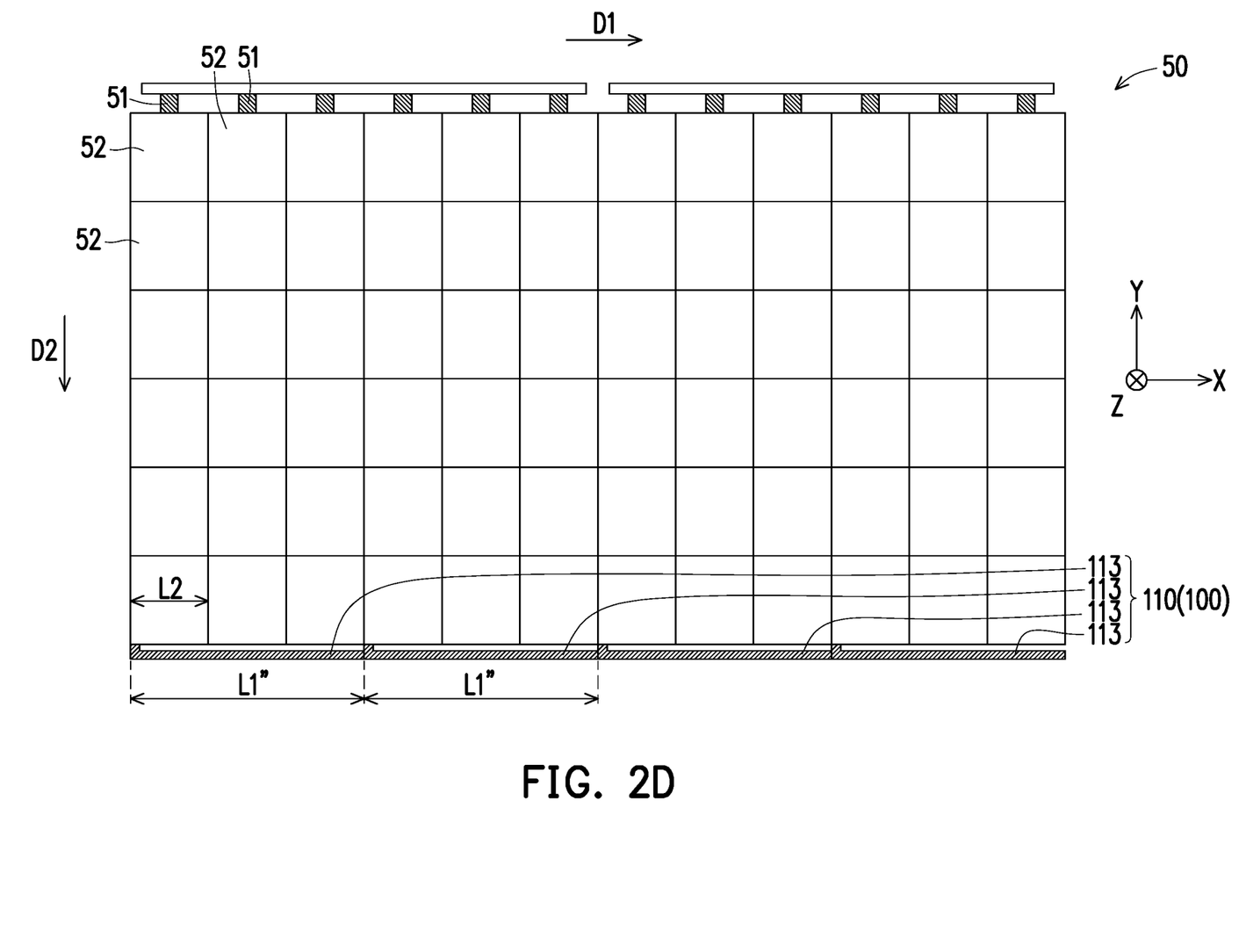

Please refer to FIG. 1 and FIG. 2D. In this embodiment, the display module 50 is composed of the display units 52 arranged in a 12×6 matrix. The backlight module 100 is located below the display module 50.

In this embodiment, the display units 52 are arranged in N rows in the first direction D1. Where N is equal to 12, the backlight module 100 located below the display module 50 may also be selected to be composed of four third light bar units 113 successively arranged below one of the columns (i.e., the sixth column) of the display units 52 farthest from the driving chips 51.

In the present embodiment, the light bar assembly 110 is disposed below the display units 52. In fact, in the projection of the Z direction, the projection area of the display units 52 does not overlap the light bar assembly 110. In addition, the light bar assembly 110 and the display units 52 are not coplanar in the Z direction, as shown in FIG. 2D, which is a top view.

Certainly, in other embodiments, the backlight module 100 located below the display module 50 may also be selected to be composed of twelve first light bar units 111, composed of six second light bar units 112, composed of six first light bar units 111 and three second light bar units 112, or composed of other combinations of said bar units, which should not be construed as a limitation in the disclosure.

In the above examples, note that the commonly used light bar units are listed for illustrative purposes. Certainly, in other embodiments, the light bar assembly may also include the light bar units of other lengths. In other embodiments, the size of the display module is not limited to the above.

The detailed structure of the light bar assembly 110 will be described in more detail below.

Figure 3A:
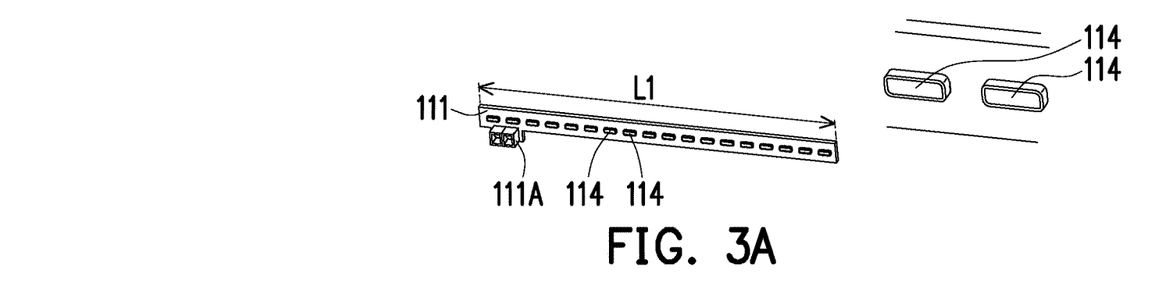
FIG. 3A to FIG. 3C are schematic three-dimensional views illustrating various light bar units according to several embodiments of the disclosure.
Figure 3B:
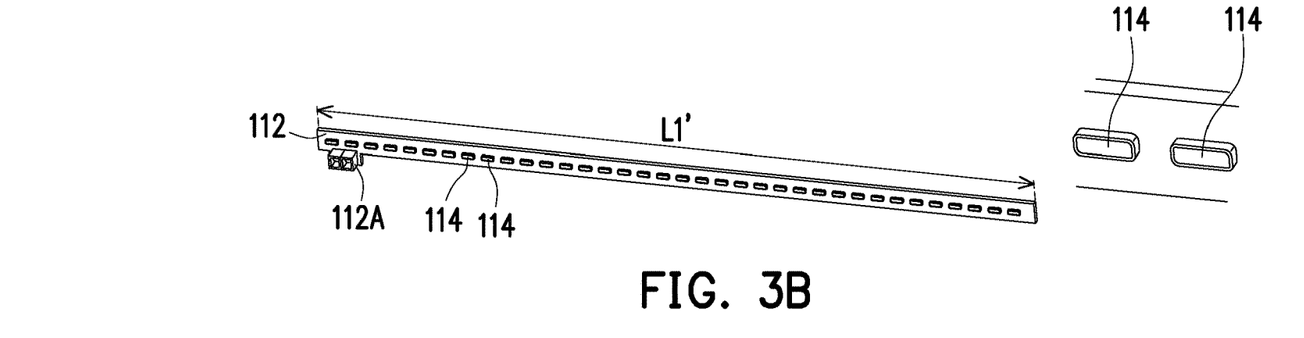
Figure 3C:
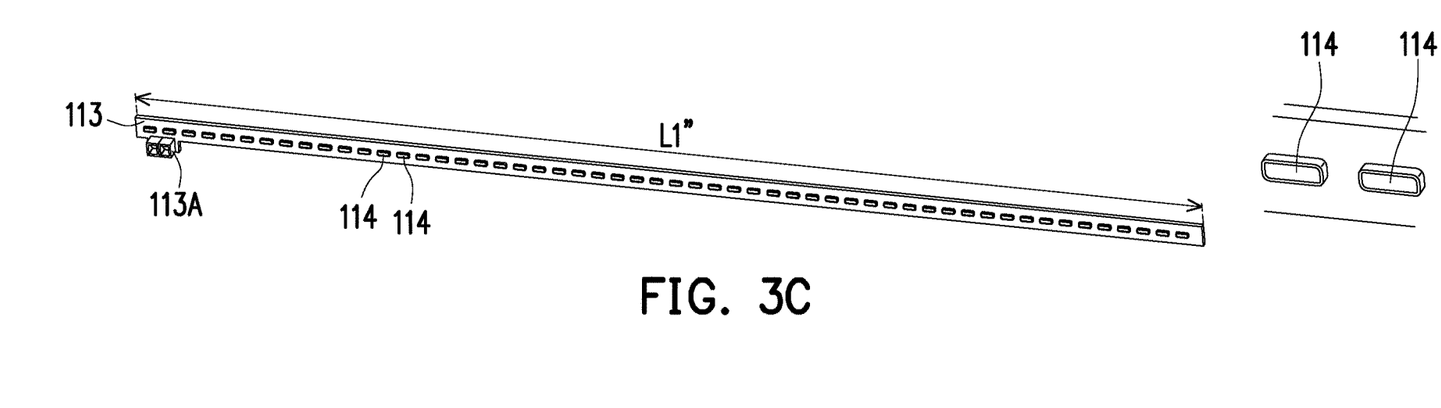

FIG. 3A to FIG. 3C are schematic three-dimensional views illustrating various light bar units according to several embodiments of the disclosure. As shown in FIG. 3A, the first light bar unit 111 includes a connector 111A and a plurality of light sources 114 electrically connected to the connector 111A. The connector 111A may be electrically connected to a circuit (not shown) to supply power to the light source 114.

Specifically, these light sources 114 are disposed on the first light bar unit 111 at equivalent intervals. As a result, the first light bar unit 111 is capable of producing relatively uniform light. Furthermore, since the light sources 114 on each first light bar unit 111 are disposed at equivalent intervals, when a plurality of first light bar units 111 are assembled, the resultant optical effects are relatively uniform.

Similarly, as shown in FIG. 3B, the second light bar unit 112 includes a connector 112A and a plurality of light sources 114 electrically connected to the connector 112A. In the present embodiment, the length of the second light bar unit 112 is, for instance, twice the length of the first light bar unit 111, which should however not be construed as a limitation in other embodiments of the disclosure. The intervals at which the light sources 114 of the second light bar unit 112 depicted in FIG. 3B are disposed are the same as the intervals at which the light sources 114 of the first light bar unit 111 depicted in FIG. 3A are disposed. Therefore, even though the first light bar unit 111 and the second light bar unit 112 are assembled to each other, uniform optical effects may be rendered.

Please refer to FIG. 3C. The third light bar unit 113 includes a connector 113A and a plurality of light sources 114 electrically connected to the connector 113A. In the present embodiment, the length of the third light bar unit 113 is, for instance, three times the length of the first light bar unit 111, which should however not be construed as a limitation in other embodiments of the disclosure.

Similarly, the intervals at which the light sources 114 of the third light bar unit 113 depicted in FIG. 3C are disposed are the same as the intervals at which the light sources 114 of the first light bar unit 111 depicted in FIG. 3A are disposed, and the intervals at which the light sources 114 of the third light bar unit 113 depicted in FIG. 3C are disposed are the same as the intervals at which the light sources 114 of the second light bar unit 112 depicted in FIG. 3B are disposed.

In particular, the intervals between the edge of the light bar unit and the light sources of the light bar unit at the two outermost sides are ½ times the intervals at which the other adjacent light sources 114 of the third light bar unit 113 depicted in FIG. 3C are disposed. That is, when a plurality of identical or different light bar units are assembled, the intervals between the light sources of the identical or different light bar units at the two outermost sides are the same as the intervals at which the adjacent light sources of one single light bar unit are disposed. Therefore, even though the first light bar unit 111, the second light bar unit 112, and the third light bar unit 113 are combined, uniform optical effects may be rendered.

As such, manufacturers need not manufacture light bars of corresponding sizes for complying with the display modules of different sizes. The first light bar unit 111, the second light bar unit 112, or the third light bar unit 113 provided in the embodiment may be assembled at discretion to form the light bars corresponding to the display modules of different sizes, so as to avoid the complicated manufacturing process (retooling or reordering parts or materials) for making the light bars for the display modules of different sizes.

On the other hand, the light bar assembly generates the significant amount of heat during operation, and hence a heat sink is often applied to reduce the temperature of the light bar assembly. The heat sink assembly applied together with the light bar assembly of different lengths may also be composed of heat sink units of different lengths, and the heat sink unit will be explained hereinafter.

Figure 4A:
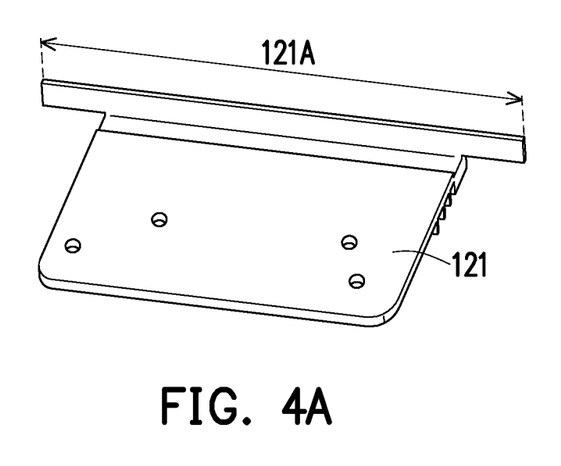
FIG. 4A to FIG. 4C are schematic views illustrating various heat sink units according to several embodiments of the disclosure.
Figure 4B:
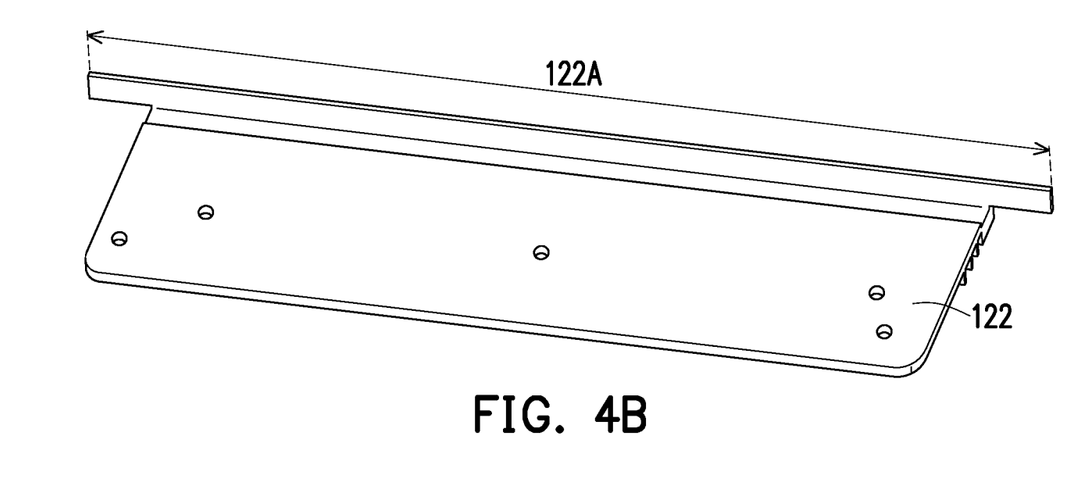
Figure 4C:
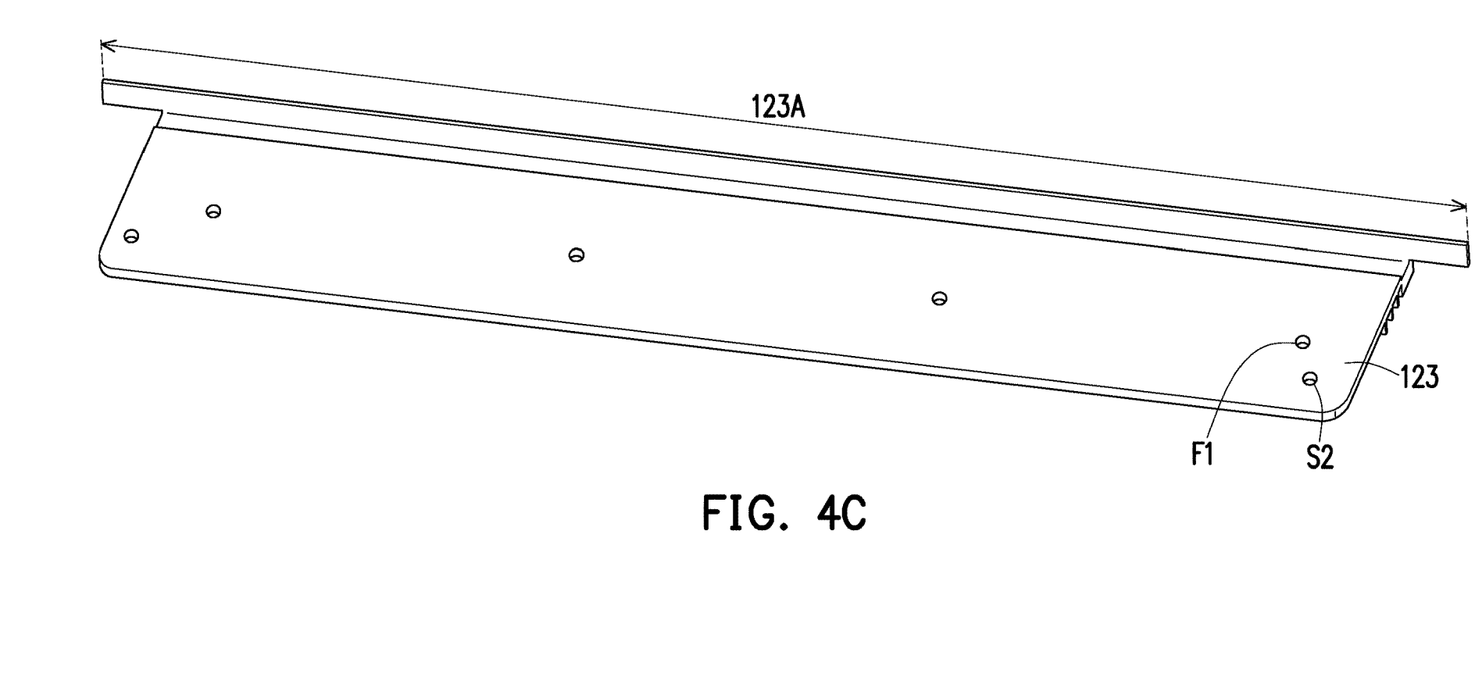

FIG. 4A to FIG. 4C are schematic views illustrating various heat sink units according to several embodiments of the disclosure. Please refer to FIG. 4A to FIG. 4C. To comply with the display modules of different sizes, the length of the heat sink assembly may vary in response to the light bar assembly of different lengths.

For instance, as shown in FIG. 3A and FIG. 4A, a length 121A of the first heat sink unit 121 depicted in FIG. 4 is identical or similar to the length L1 of the first light bar unit 111 depicted in FIG. 3A, so that the first light bar unit 111 is adapted to match the first heat sink unit 121.

As shown in FIG. 3B and FIG. 4B, a length 122A of the second heat sink unit 122 depicted in FIG. 4B is, for instance, identical or similar to the length L1' of the second light bar unit 112 depicted in FIG. 3B, so that the second light bar unit 112 is adapted to match the second heat sink unit 122.

As shown in FIG. 3C and FIG. 4C, a length 123A of the third heat sink unit 123 depicted in FIG. 4C is, for instance, identical or similar to the length L1" of the third light bar unit 113 depicted in FIG. 3C, so that the third light bar unit 113 is adapted to match the third heat sink unit 123.

Figure 5A:
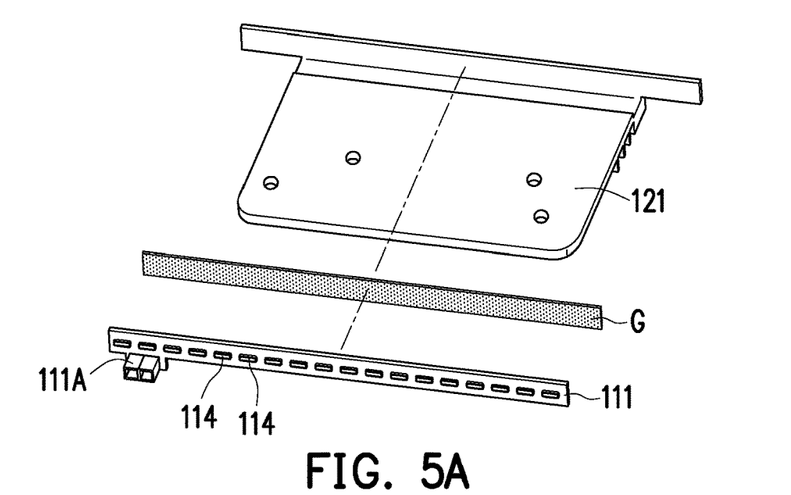
FIG. 5A is a schematic exploded view illustrating a first light bar unit and a first heat sink unit according to an embodiment of the disclosure.
Figure 5B:
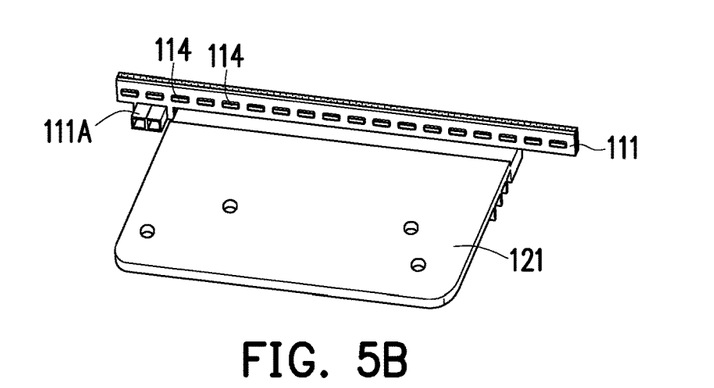
FIG. 5B is a schematic view illustrating an assembly of the first light bar unit and the first heat sink unit depicted in FIG. 5A.
Figure 5C:
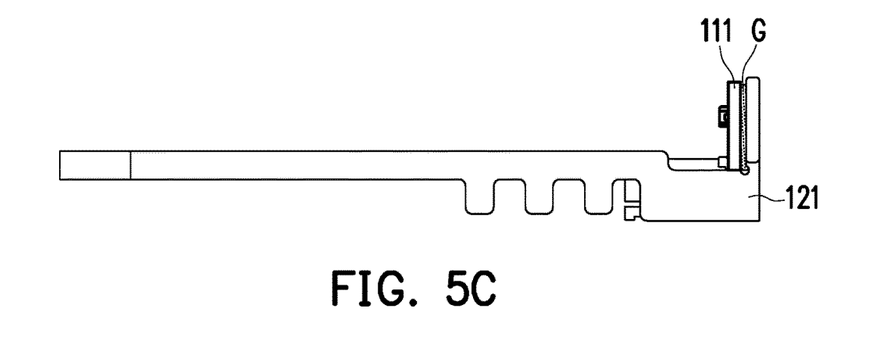
FIG. 5C is a schematic side view of FIG. 5B.

In detail, FIG. 5A is a schematic exploded view illustrating a first light bar unit and a first heat sink unit according to an embodiment of the disclosure. FIG. 5B is a schematic view illustrating an assembly of the first light bar unit and the first heat sink unit depicted in FIG. 5A. FIG. 5C is a schematic side view of FIG. 5B. With reference to FIG. 5A to FIG. 5C, in the present embodiment, the first light bar unit 111 is disposed on the first heat sink unit 121 and is thermally coupled to the first heat sink unit 121. Certainly, in other embodiments, the first light bar unit 111 may be disposed directly on the existing heat sink, which should not be construed as a limitation in the disclosure.

In the present embodiment, the first heat sink unit 121 is fixed to and thermally coupled to the first light bar unit 111. Since the first heat sink unit 121 is thermally coupled to the first light bar unit 111, the heat of the first light bar unit 111 may be conducted to the first heat sink unit 121. The first heat sink unit 121 is fixed to the first light bar unit 111 by an adhesive material and the adhesive material G is, for instance, a thermal conductive adhesive; however, in other embodiments, the manner in which the first heat sink unit 121 is fixed to the first light bar unit 111 is not limited to what is described here.

Figure 6:
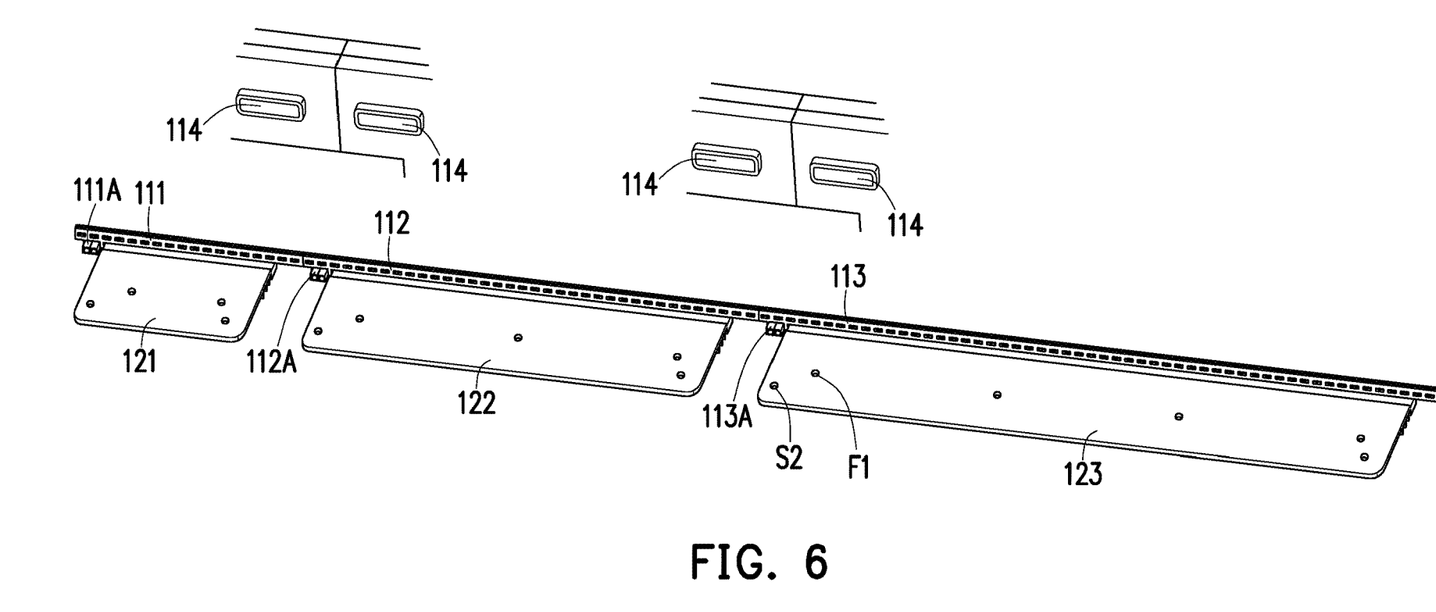
FIG. 6 is a schematic view illustrating an assembly of a light bar assembly and a heat sink assembly according to an embodiment of the disclosure.

FIG. 6 is a schematic view illustrating an assembly of a light bar assembly and a heat sink assembly according to an embodiment of the disclosure. With reference to FIG. 6, the first heat sink unit 121 is fixed to and thermally coupled to the first light bar unit 111, the second heat sink unit 122 is fixed to and thermally coupled to the second light bar unit 112, and the third heat sink unit 123 is fixed to and thermally coupled to the third light bar unit 113.

As shown in FIG. 5C, note that the bottom of the first light bar unit 111 adjoins the first heat sink unit 121. Since the first heat sink unit 121, the second heat sink unit 122, and the third heat sink unit 123 have the same sectional design, the first light bar unit 111, the second light bar unit 112, and the third light bar unit 113 may be of consistent height, which ensures uniformity of the light.

In addition, as shown in FIG. 6, when the first light bar unit 111, the second light bar unit 112, and the third light bar unit 113 are connected, the connectors 111A, 112A, and 113A face the same side to, so that a plug may be easily connected to the connectors 111A, 112A, and 113A from the same direction. In addition, the light sources 114 are disposed on the first light bar unit 111, the second light bar unit 112, and the third light bar unit 113 at equivalent intervals to achieve light uniformity. In particular, at the intersection of the first light bar unit 111, the second light bar unit 112, and the third light bar unit 113, the adjacent light source 114s are still disposed at equivalent intervals, so as to ensure uniformity of light.

As such, manufacturers need not manufacture heat sinks of the corresponding sizes for complying with the display modules of different sizes. The first heat sink unit 121, the second heat sink unit 122, and the third heat sink unit 123 provided in the present embodiment may be assembled at discretion to form the heat sink assembly of the lengths corresponding to the display modules of different sizes, so as to avoid the complicated manufacturing process (retooling or reordering parts or materials) for making the heat sinks for the display modules of different sizes.

Figure 7:
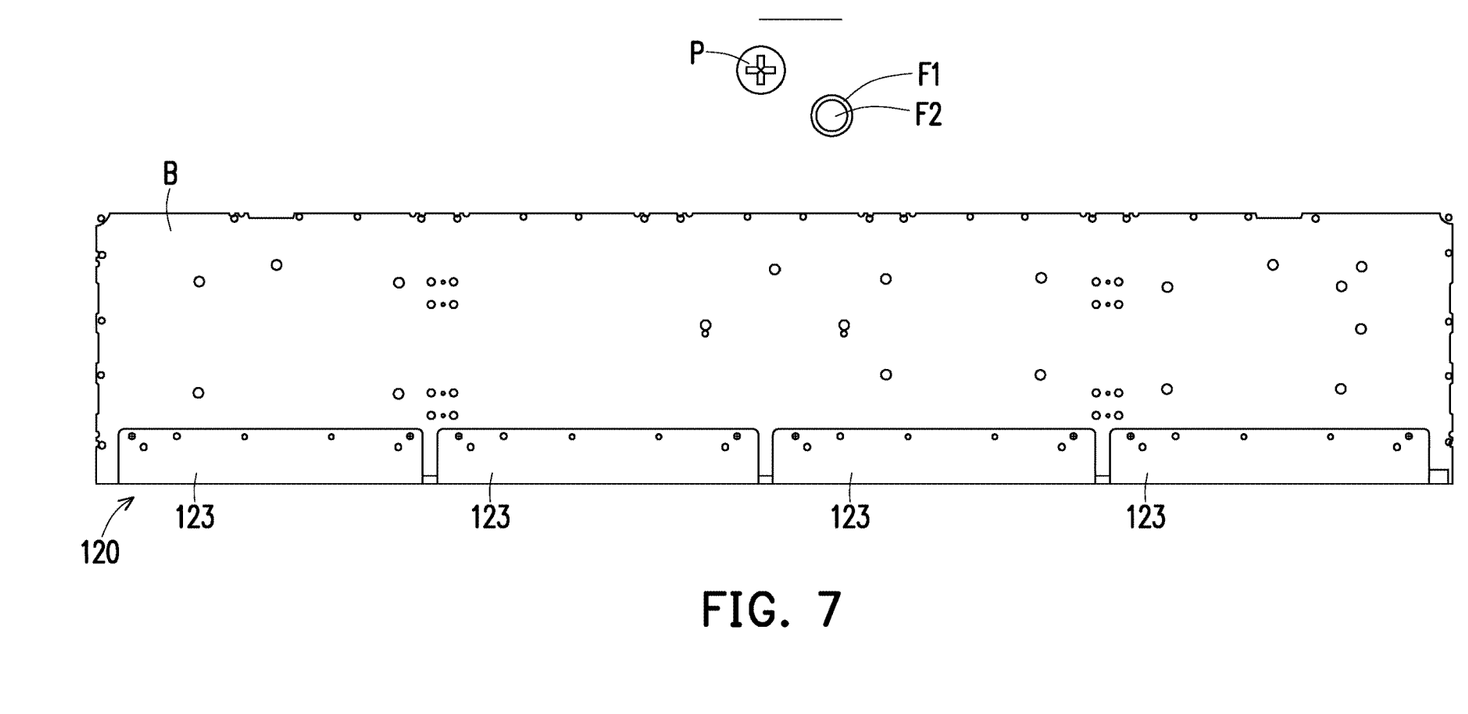
FIG. 7 is a schematic bottom view illustrating that the heat sink assembly depicted in FIG. 1 is assembled to a back plate of a backlight module.

FIG. 7 is a schematic bottom view illustrating that the heat sink assembly depicted in FIG. 1 is assembled to a back plate of a backlight module. Please refer to FIG. 1, FIG. 2D, and FIG. 7 at the same time. As exemplarily shown in FIG. 2D, when the display units 52 are arranged in 12 rows in the first direction D1, four third light bar units 113 (FIG. 3C) may serve as light-emitting elements in the display module 50, and the heat sink assembly 120 is employed to dissipate heat of the third light bar units 113 (FIG. 3C). In the present embodiment, the heat sink assembly 120 is composed of four third heat sink units 123.

In the present embodiment, the third heat sink unit 123 is fixed to the back plate B of the backlight module 100 (FIG. 1), and the back plate B has a screw hole S1 (FIG. 1) and a fixing pillar F2 (FIG. 1). The fixing pillar F2 of the back plate B is adapted to be inserted into the fixing hole F1 (FIG. 4C) of the third heat sink unit 123 to position both. Further, the third heat sink unit 123 includes a through hole or a screw hole S2 (FIG. 4C). The third heat sink unit 123 may be locked to the screw hole S2 (FIG. 4C) of the third heat sink unit 123 and the screw hole S1 (FIG. 1) of the back plate B by a screw P; alternatively, the third heat sink unit 123 may be locked to the screw hole S1 (FIG. 1) of the back plate B by the screw P passing through the through hole of the third heat sink unit 123, and the third heat sink unit 123 is then fixed to the back plate B. However, in other embodiments, the manner in which the third heat sink unit 123 is fixed to the back plate B is not limited thereto.

That is to say, the back plate of the backlight module may have a fixing structure corresponding to the heat sink unit, so that the heat sink assembly in different forms may be easily fixed to the back plate of the backlight module.

To sum up, the backlight module provided in one or more embodiments of the disclosure includes the light bar assembly that includes at least one light bar unit. Specifically, the light bar assembly may be composed of a plurality of light bar units corresponding to the display module of different sizes and may provide the light sources required by the display module. As such, manufacturers need not manufacture special light bars of corresponding sizes for complying with the display devices of different sizes, and the first, second, and third light bar units provided in one or more embodiments of the disclosure may be assembled at discretion to form the light bar assembly corresponding to the display modules of different sizes, so as to avoid the complicated manufacturing process (retooling or reordering parts or materials) for making the light bars for the display modules of different sizes. On the other hand, the heat sinks may also be assembled in response to the light bar assembly, which means that the manufacturers need not manufacture heat sinks of corresponding sizes for complying with the display modules of different sizes. The first, second, and third heat sink units provided in the present embodiment may be assembled at discretion to form the heat sink assembly of the lengths corresponding to the display modules of different sizes, so as to avoid the complicated manufacturing process (retooling or reordering parts or materials) for making the heat sinks for the display modules of different sizes.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A display device comprising:
   a display module comprising a plurality of display units and N driving chips, wherein the N driving chips are arranged along a first direction and electrically connected to the display units respectively, the display units are connected to each other and are arranged in N rows in the first direction and in M columns in a second direction, and N and M are respectively greater than or equal to 1; and
   a backlight module comprising a light bar assembly adapted to be disposed below one column of the M columns of the display units farthest from the driving chips, a length of the light bar assembly corresponding to a length of each of the display units along the first direction, wherein
   the light bar assembly comprises at least one first light bar unit, a length of each of the at least one first light bar unit is X times the length of each of the display units along the first direction, and X is greater than or equal to 1, wherein
   the light bar assembly further comprises at least one second light bar unit, a length of each of the at least one second light bar unit is Y times the length of each of the display units along the first direction, Y is greater than or equal to 1 but is not equal to X, the at least one first light bar unit and the at least one second light bar unit are successively arranged below the one column of the M columns of the display units farthest from the driving chips.

2. The display device according to claim 1, wherein the at least one first light bar unit comprises a plurality of first light bar units successively arranged below the one column of the M columns of the display units farthest from the driving chips.

3. The display device according to claim 2, wherein the light bar assembly comprises a plurality of connectors respectively located on the first light bar units, and the connectors face one side.

4. The display device according to claim 1, wherein the light bar assembly comprises a plurality of light sources disposed on the at least one first light bar unit at equivalent intervals.

5. The display device according to claim 1, further comprising:
   at least one first heat sink unit fixed to and thermally coupled to the at least one first light bar unit, a length of each of the at least one first heat sink unit being equal to the length of the at least one first light bar unit.

6. The display device according to claim 1, wherein the light bar assembly comprises a plurality of connectors respectively located on the at least one first light bar unit and the at least one second light bar unit, and the connectors face one side.

7. The display device according to claim 1, wherein X is equal to 1 and Y is equal to 2.

8. The display device according to claim 1, wherein the light bar assembly comprises a plurality of light sources disposed on the at least one first light bar unit and the at least one second light bar unit at equivalent intervals.

9. The display device according to claim 1, further comprising:
   at least one first heat sink unit fixed to and thermally coupled to the at least one first light bar unit, a length of each of the at least one first heat sink unit being equal to the length of the at least one first light bar unit; and
   at least one second heat sink unit fixed to and thermally coupled to the at least one second light bar unit, a length of each of the at least one second heat sink unit being equal to the length of the at least one second light bar unit.

10. The display device according to claim 1, wherein the light bar assembly further comprises at least one third light bar unit, each of the at least one third light bar unit has a length Z times the length of each of the display units along the first direction, Z is greater than or equal to 1 but is not equal to X nor Y, the at least one first light bar unit, and the at least one second light bar unit, and the at least one third light bar unit are successively arranged below the one column of the M columns of the display units farthest from the driving chips.

11. The display device according to claim 10, the light bar assembly comprises a plurality of connectors respectively located on the at least one first light bar unit, the at least one second light bar unit, and the at least one third light bar unit, the connectors facing one side.

12. The display device according to claim 10, wherein X is equal to 1, Y is equal to 2, and Z is equal to 3.

13. The display device according to claim 10, wherein the light bar assembly comprises a plurality of light sources disposed on at least one first light bar unit, the at least one second light bar unit, and the at least one third light bar unit at equivalent intervals.

14. The display device according to claim 10, further comprising:
   at least one first heat sink unit fixed to and thermally coupled to the at least one first light bar unit, a length of each of the at least one first heat sink unit being equal to the length of the at least one first light bar unit;
   at least one second heat sink unit fixed to and thermally coupled to the at least one second light bar unit, a length of each of the at least one second heat sink unit being equal to the length of the at least one second light bar unit; and
   at least one third heat sink unit fixed to and thermally coupled to the at least one third light bar unit, a length of each of the at least one third heat sink unit being equal to the length of the at least one third light bar unit.

* * * * *